United States Patent [19]

Miller

[11] Patent Number: 5,355,974
[45] Date of Patent: Oct. 18, 1994

[54] PORTABLE TREE STAND

[76] Inventor: Kenneth L. Miller, 4476 S. Licking Pike, Alexandria, Ky. 41001

[21] Appl. No.: 44,726

[22] Filed: Apr. 12, 1993

[51] Int. Cl.$^5$ ............................................. A01M 31/02
[52] U.S. Cl. .................................... 182/187; 108/152
[58] Field of Search ........ 182/187, 116, 188, 133–136; 108/152

[56] References Cited

U.S. PATENT DOCUMENTS

| | | | |
|---|---|---|---|
| 3,338,332 | 8/1967 | Brantly | 182/187 |
| 3,358,789 | 12/1967 | Laun | 182/187 X |
| 3,419,108 | 12/1968 | Mobbs | 182/187 X |
| 4,605,094 | 8/1986 | Minerd | 182/129 X |
| 4,834,217 | 5/1989 | Manes | 182/108 |
| 4,942,942 | 7/1990 | Bradley | 182/182 |
| 4,997,063 | 3/1991 | Bradley | 182/182 |

FOREIGN PATENT DOCUMENTS 809611 7/1951 Fed. Rep. of Germany ...... 182/187

*Primary Examiner*—Alvin C. Chin-Shue
*Attorney, Agent, or Firm*—Rhodes & Ascolillo

[57] ABSTRACT

An apparatus for supporting a person at a preselected height on a stanchion has a floor member and a frame member that attaches to the floor member. A seat hingingly attaches and selectively locks to the floor member. A support member, having a piercing member, attaches to the floor member. A sound reducing means is located in the support member. An attachment device connects to the floor member. An adjustable tightening means adjustably attaches to the attachment device at one end and attaches the frame member at the other end to adjustably tighten the attachment device. A gripping means attaches to the frame member to reduce sliding of the apparatus down the tree.

9 Claims, 4 Drawing Sheets

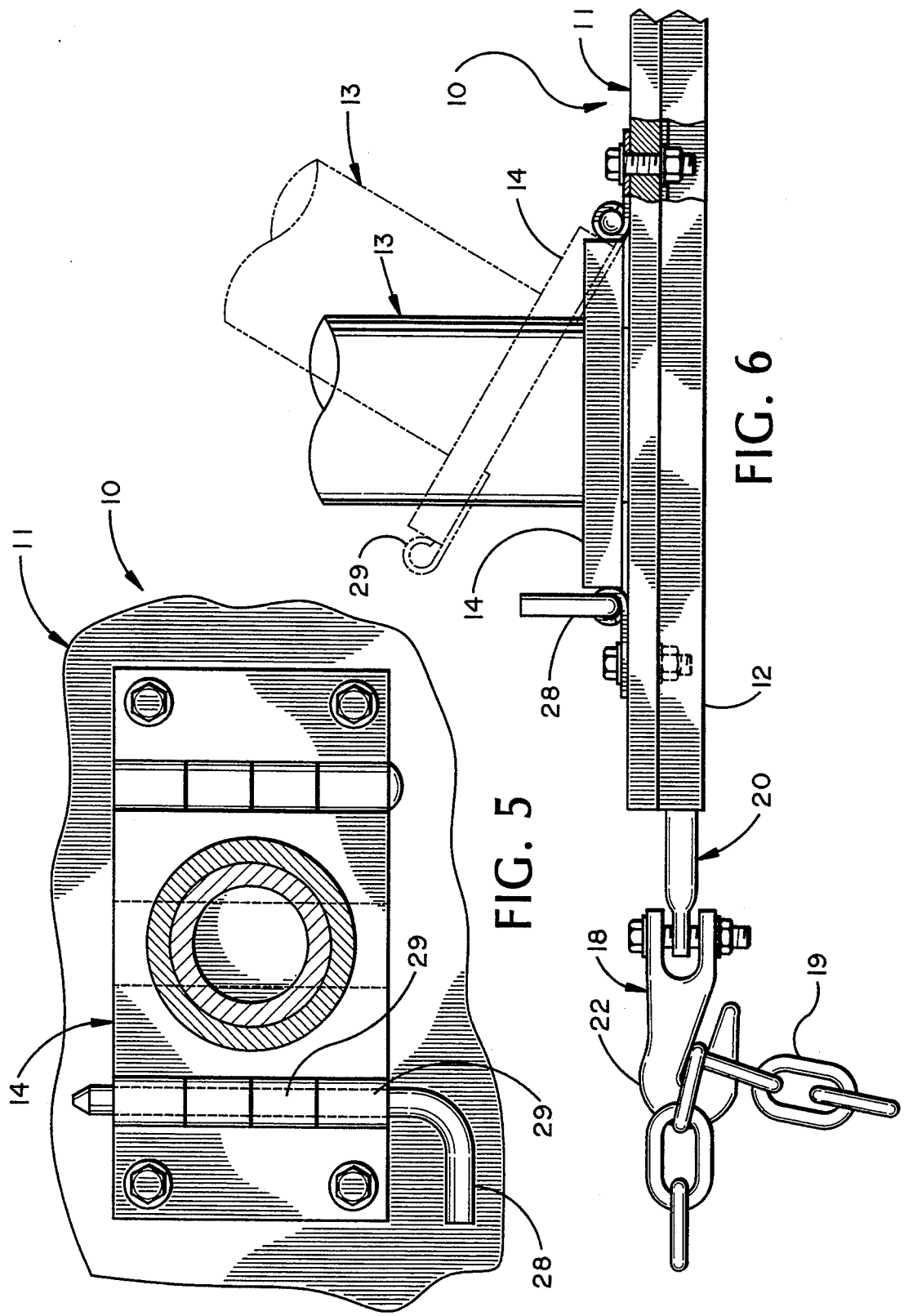

5,355,974

PORTABLE TREE STAND

BACKGROUND OF THE INVENTION

1. Field of the Invention

This invention relates to a portable tree stand to enable hunters and other observers, such as photographers, to place themselves in a position to observe animals before the game scents or sees them.

2. Description of the Related Art

Hunters and wildlife photographers have used various devices to unobtrusively observe wildlife. Platform stands located in trees serve this purpose fairly well. Over the years, several stands have been developed. These stands have varied in construction. A sought-after feature is ease of placement at the desired location and portability. Previous patents have tried to approach these goals in various manners.

U.S. Pat. No. 4,834,217 to J. J. Manes on Mar. 30, 1989 for a Tree Stand with Improved Locking Means describes a two-part stand having, for one part, a sliding bar to facilitate use of the stand on different size trees and, for a second part, a climbing aid.

U.S. Pat. No. 4,942,942 to R. E. Bradley on Jul. 24, 1990 for a Wedging Tree Stand shows a tree engaging, spring-loaded, v-shaped bar having a position biased pin lock that allows the stand to be pushed away from the tree for removal or adjustment when the pin is removed.

U.S. Pat. No. 4,997,063 to R. E. Bradley on Mar. 05, 1991 for a Collapsible and Adjustable Tree Stand describes a two-part stand. The upper part is for the user to sit upon and the lower part is for placement of the feet. Each part has a threadingly adjustable device to raise or lower the seat or floor of the upper and lower part, respectively. Both parts adjust to the girth of the tree by selectively placing bolts in one of several bolt holes.

The present invention more easily adjusts to accommodate different girth trees, reduces the chance of the stand slipping from the selected position and transports much easier than the related art thus reducing apprehension and wear and tear on the user.

SUMMARY OF THE INVENTION

The present tree stand is virtually ideal for any hunter or wildlife photographer. It is portable and easy to install at a predetermined height in a tree.

In one embodiment, an apparatus for supporting a person at a preselected height on a stanchion is described herein that has a floor member and a seat attached to the floor member. A support member, having a piercing member, is attached to the floor member. There is an attachment means connected to the floor member. A gripping means is attached to the floor member.

In another embodiment, an apparatus for supporting a person at a preselected height on a stanchion has a floor member and a frame member attached to the floor member. There is a seat hingingly attached and selectively locked to the floor member. A support member, having a piercing member, is attached to the floor member. There is an attachment device connected to the floor member and an adjustable tightening means is adjustably attached to the attachment to device and is attached the frame member to adjustably tighten the attachment device. A gripping means is attached to the frame member.

It is an object of this invention to provide a tree stand that is easily placed at a predetermined height in a tree.

It is another object of this invention to provide a tree stand that is easily stored and transported.

It is yet another object of this invention to provide a tree stand that reduces slippage from the selected position on the tree.

Another object of this invention is to provide a tree stand that allows the user to easily adjust the attachment device to the circumference of the tree.

BRIEF DESCRIPTION OF THE DRAWINGS

FIG. 5 is an enlarged partial cross-sectional view taken along lines 5—5 of FIG. 2.

FIG. 6 is an enlarged partial right side elevational view showing the hinged seat member in a closed, locked operable position and, in broken lines, showing the seat member unlocked a being placed in the open, transport or stored position.

DESCRIPTION OF THE PREFERRED EMBODIMENT

Figure 1:
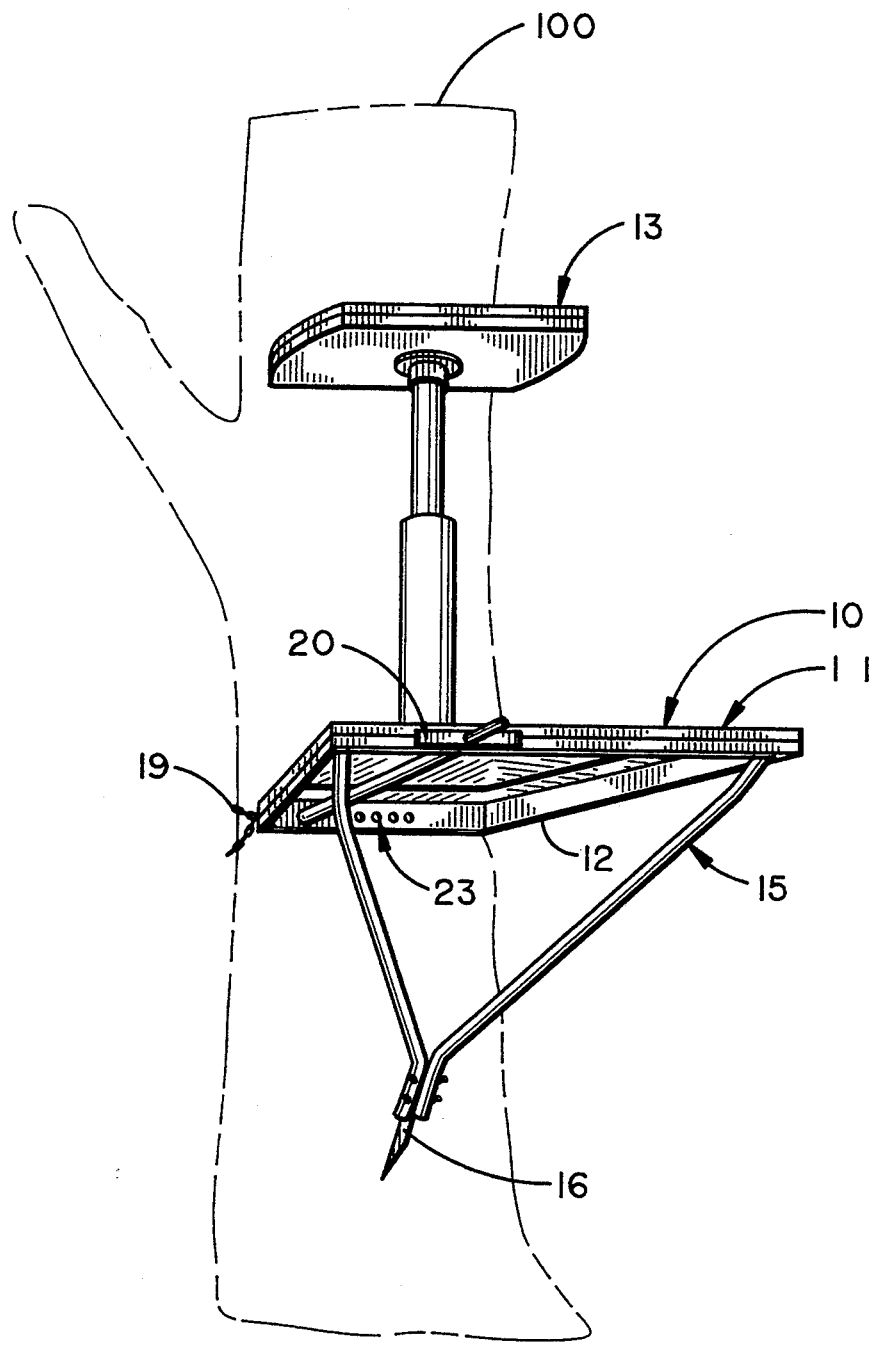
FIG. 1 is a perspective view of a portable tree stand shown attached to a tree. However, the stand could be attached to any suitable stanchion such as a pole or fabricated upright.
Figure 7:
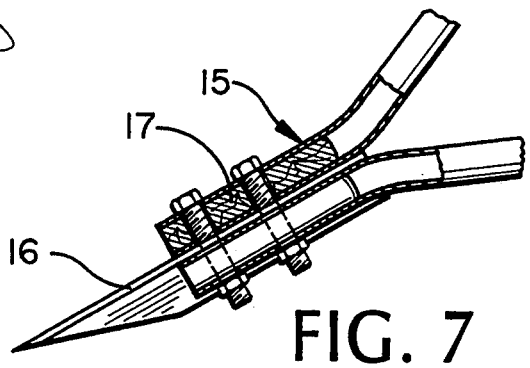
FIG. 7 is an enlarged partial cross-sectional view along lines 7—7 of FIG. 2.
Figure 3:
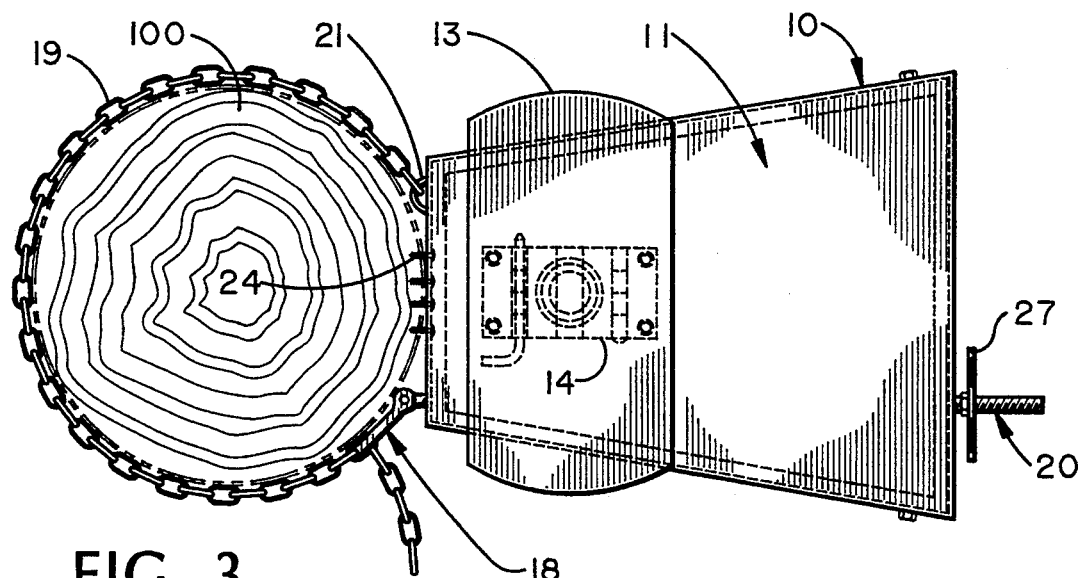
FIG. 3 is a top plan view.

Referring to FIGS. 1 through 7, an apparatus 10 for supporting a person at a preselected height on a stanchion, such as a tree 100, has a floor member 11 and a frame member 12 attached to the floor member 11. A seat 13 is hingingly attached and selectively locked to the floor member 11 by hinge and lock mechanism 14 [See FIG. 6 which shows the hinge and lock mechanism 14 of the seat 13 in both the open-unlocked position (in phantom) and in the closed-locked position.]. There is a support member 15, having a piercing member 16 (such as sharpened angle bar stock or the equivalent), attached to the floor member 11. There is a sound reducing means 17, such as wooden dowels, in the support member 15 to reduce noise when the user moves around on the stand or apparatus 10. There is an attachment device 18 connected to the floor member. The attachment device may include a chain 19, a mounting bracket 21 and a hook 22. There is an adjustable tightening means 20 adjustably attached to the attachment device 18 at the hook 22 and attached the frame member 12 to adjustably tighten the attachment device 18. A gripping means 23, such as long pointed screws 24, is attached to the frame member 12 and pierces the tree to reduce the chance that apparatus 10 will slide down the tree 100 when weight is placed on the apparatus 10.

Figure 2:
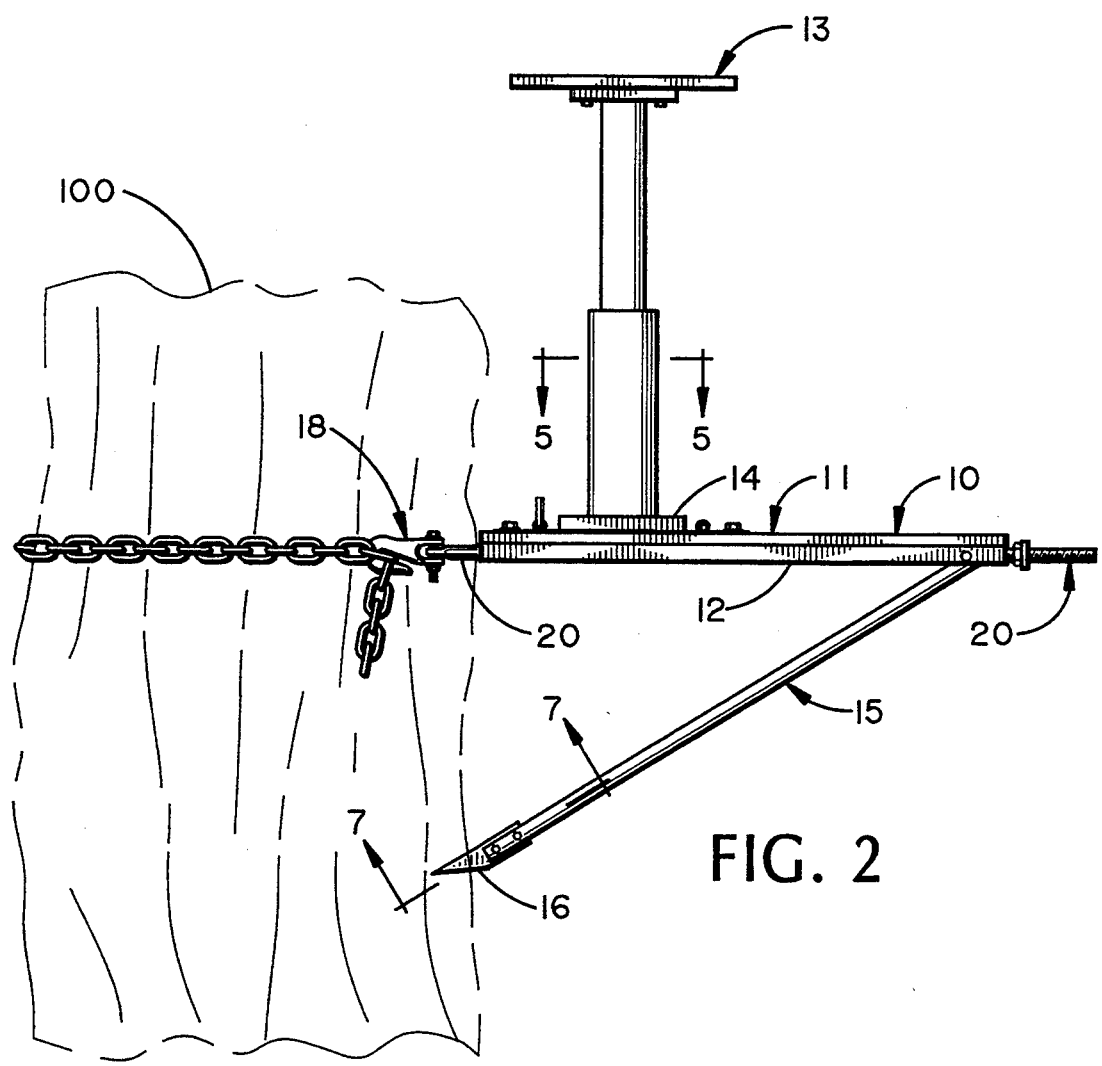
FIG. 2 is a right side elevational view showing the stand in its operative mode at a preselected height in a tree.
Figure 4:
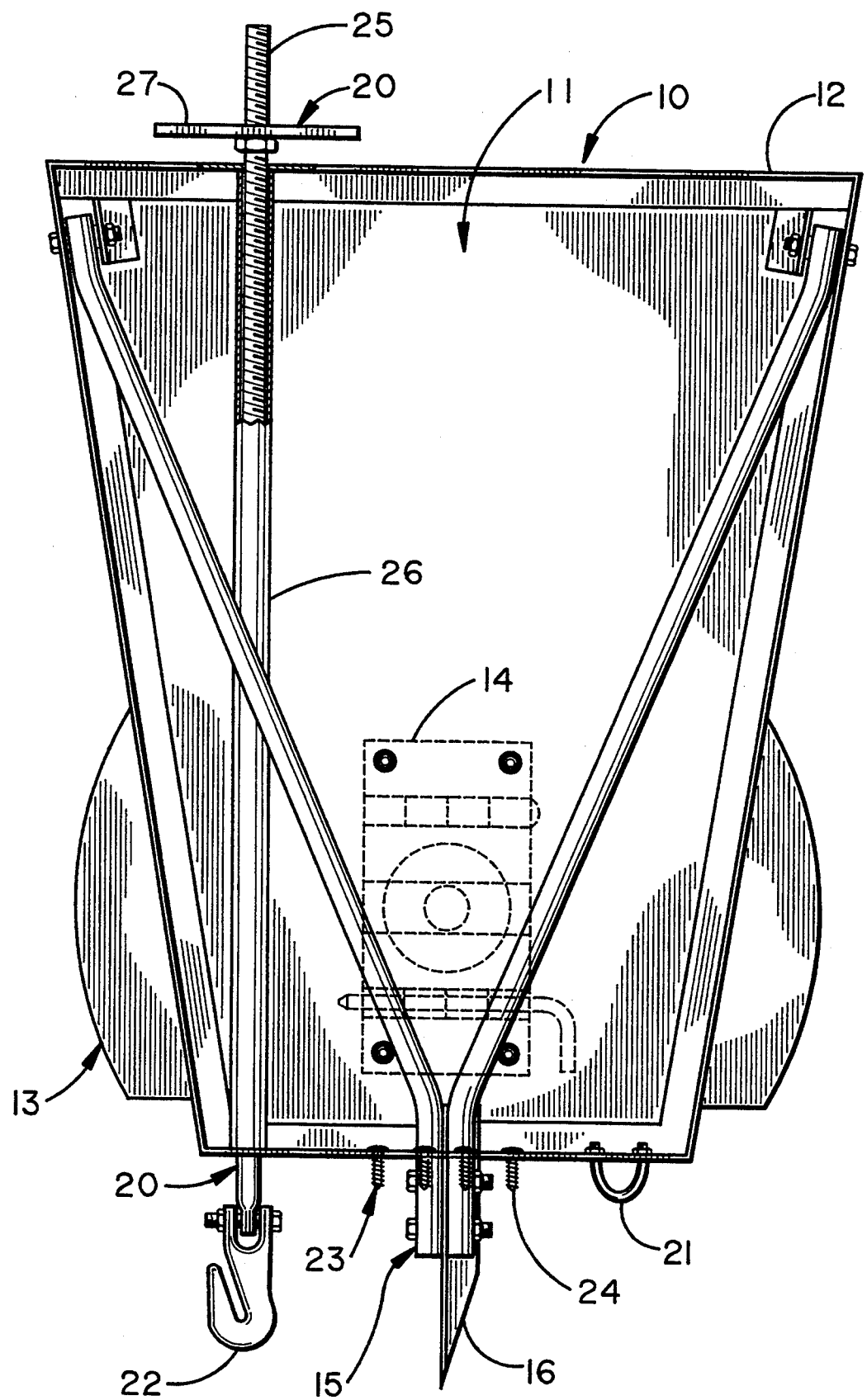
FIG. 4 is a bottom plan view of the stand shown in its stored or transport mode.

To operate the tree stand apparatus 10, the user selects the height on the tree 100 at which he desires to place the stand. He loops the chain 19 around the tree and hooks the chain 19 into hook 22 . The gripping member 23, i.e. screws 24, are placed at the preselected position. The adjustable tightening means 20, shown as a threaded rod 25, a guide tube 26 and a handle 27, is then tightened or loosened by turning handle 27. As the tightening means 20 tightens chain 19 around the tree, screws 24 are driven deeper into the tree. This allows the frame 12 to which the screws 24 are attached to better grip the tree 100 (See FIG. 3). Once the floor member 11 is in position, the floor member 11 is tilted upwards slightly and the piercing member 16 of support member 15 is lodged against the tree 100 as shown in FIGS. 1 and 2. The floor member 11 is then lowered and weight on the floor member 11 causes the piercing member 16 to pierce the tree 100 stabilizing the apparatus or stand 10. Removal from the tree is accomplished by reversal of the above steps.

The seat 13 is hinged to allow the stand 10 to be more portable and the seat may be locked into a secure position during use by inserting lock pin 28 into the lock pin receivers 29.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An apparatus for supporting a person at a preselected height on a stanchion comprising:
   (a) a floor member having trapezoidal upper and lower surfaces, said surfaces being bounded by:
      a first parallel edge to abut said stanchion;
      a second parallel edge being substantially wider than said first parallel edge;
      a first diagonal edge; and
      a second diagonal edge;
   (b) a frame member attached to the lower surface of said floor member, said frame member having a trapezoidal outline corresponding to the trapezoidal surfaces of said floor member, including:
      a first parallel edge to abut said stanchion;
      a second parallel edge being substantially wider than said first parallel edge;
      a first diagonal edge; and
      a second diagonal edge;
   (c) a seat hingingly attached and selectively locked to the floor member, said seat having
      a horizontal support for supporting the person;
      a pedestal having a proximal end attached to a lower surface of said horizontal support;
      a hinge and lock mechanism including:
         a base member attached to a distal end of said pedestal;
         a hinge attached to a first edge of said base member and attached to said floor member;
         a lock pin;
         a lock pin receiver having:
            a first mating receiver fixedly attached to a second edge of said base member, said second edge being disposed opposite said first edge, and
            a second mating receiver fixedly attached to said floor member, said first and second mating receivers being mounted to allow cooperative alignment of said receivers to accommodate the removable insertion of said lock pin;
   (d) a support member, having a piercing member, attached to the frame member;
   (e) an attachment device connected to the floor member, said attachment device including:
      a mounting bracket threadingly attached to the first parallel edge of said frame member and adjacent the first diagonal edge of said frame member;
      a hook pivotally and removably disposed on the first parallel edge of said frame member and adjacent the second diagonal edge of said frame member; and
      a chain for wrapping around said stanchion, said chain being removably attachable to said hook and fixedly attached to said mounting bracket;
   (f) an adjustable tightening means adjustably attached to the attachment device and removably attached to the frame member to adjustably tighten the attachment device, said adjustable tightening means including:
      a first guide tube opening disposed in said first parallel edge of said frame member, said first guide tube opening being disposed substantially adjacent the second diagonal edge of said frame member;
      a second guide tube opening disposed in said second parallel edge of said frame member, said second guide tube opening being disposed substantially adjacent the second diagonal edge of said frame member;
      a hollow guide tube having:
         a first end fixedly attached to the frame member surrounding said first guide tube opening; and,
         a second end fixedly attached to the frame member surrounding said second guide tube opening;
      a threaded rod for removable and slidable insertion into said hollow guide tube, said hook being pivotally and removably attached to a distal end of said threaded rod; and
      a handle threadingly attached to a proximal end of said threaded rod; and,
   (g) a gripping means attached to the frame member.

2. The apparatus as defined in claim 1, wherein said support member further comprises:
   (a) a first leg having a proximal end pivotally attached to the first diagonal edge of said frame member and substantially adjacent said second parallel edge of said frame member;
   (b) a second leg having a proximal end pivotally attached to the second diagonal edge of said frame member and substantially adjacent said second parallel edge of said frame member; and
   (c) said piercing member being inserted between a distal edge of said first leg and a distal edge of said second leg, the distal edges of said first and second legs and said piercing member being removably attached to one another at a midpoint of said first parallel edge of said frame member.

3. The apparatus as defined in claim 2, said first and second legs being hollow bent cylindrical tubes.

4. The apparatus as defined in claim 3, said piercing member being substantially L-shaped and having:
   (a) a proximal edge for insertion between said distal edges of said first and second legs; and
   (b) a pointed distal edge for insertion into said stanchion.

5. The apparatus as defined in claim 4, wherein said piercing member and said distal edges of said first and second legs are removably attached to one another by at least one threaded connector.

6. The apparatus as defined in claim 5, said gripping means further comprises a plurality of pointed metal projections removably attached to the first parallel edge of said frame member, each point of said plurality of pointed metal projections extending outwardly from said frame member.

7. The apparatus as defined in claim 6, wherein said plurality of pointed metal projections are threadingly attached to said frame member.

8. The apparatus as defined in claim 7, wherein said apparatus further comprises a sound reducing means inserted into the distal edges of said first and second legs.

9. The apparatus as defined in claim 8, wherein said sound reducing means further comprises wooden dowels.

* * * * *